US012658418B2

(12) United States Patent
Covey et al.

(10) Patent No.: US 12,658,418 B2
(45) Date of Patent: Jun. 16, 2026

(54) METHODS AND SYSTEMS FOR PERFORMING REACTIONS WITHIN DIRECT SAMPLING INTERFACES FOR MASS SPECTROMETRIC ANALYSIS

(71) Applicant: DH Technologies Development Pte. Ltd., Singapore (SG)

(72) Inventors: Thomas Covey, Concord (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 353 days.

(21) Appl. No.: 18/569,787

(22) PCT Filed: Jun. 24, 2022

(86) PCT No.: PCT/IB2022/055907
§ 371 (c)(1),
(2) Date: Dec. 13, 2023

(87) PCT Pub. No.: WO2023/275694
PCT Pub. Date: Jan. 5, 2023

(65) Prior Publication Data
US 2024/0282563 A1 Aug. 22, 2024

Related U.S. Application Data

(60) Provisional application No. 63/217,202, filed on Jun. 30, 2021.

(51) Int. Cl.
*H01J 49/04* (2006.01)
*H01J 49/00* (2006.01)

(52) U.S. Cl.
CPC ...... *H01J 49/0404* (2013.01); *H01J 49/0031* (2013.01); *H01J 49/0413* (2013.01); *H01J 49/0431* (2013.01)

(58) Field of Classification Search
CPC .............. H01H 49/0404; H01J 49/0031; H01J 49/0413; H01J 49/0431
See application file for complete search history.

(56) References Cited

U.S. PATENT DOCUMENTS

2013/0294971 A1* 11/2013 Van Berkel .............. G01N 1/02 422/68.1
2020/0191794 A1 6/2020 Cahill
2021/0121905 A1 4/2021 Covey et al.

FOREIGN PATENT DOCUMENTS

WO 2018069872 A1 4/2018

OTHER PUBLICATIONS

Gary J. Van Berkel et al: "Combined Falling Drop/Open Port Sampling Interface System for Automated Flow Injection Mass Spectrometry", Analytical Chemistry, vol. 89, No. 22, Nov. 21, 2017 (Nov. 21, 2017), pp. 12578-12586.

(Continued)

*Primary Examiner* — Nicole M Ippolito

(57) ABSTRACT

Methods and systems for delivering a liquid sample to an ion source for the generation of ions and subsequent analysis by mass spectrometry are provided herein. In accordance with various aspects of the present teachings. MS-based systems and methods are provided in which the flow of solvent into an open port sampling probe fluidly coupled to an ion source can be selectively stopped during the addition of one or more reagents into the drained open end of the sampling probe. Upon re-initiating the flow of solvent, the reagents and/or the reaction products can be delivered to the ion source. In one aspect, a method for chemical analysis is provided, the method comprising directing a flow of a first solvent from a solvent conduit to an ion source via a sampling space of a sampling probe, wherein the sampling space is at least partially defined by an open end of the sampling probe. The flow of the first solvent into the sampling space from the (Continued)

solvent conduit may be terminated for a first duration, and the sampling space drained. A second solvent and one or more reactants may then be added to the drained sampling space through the open end during the first duration. Thereafter, the flow of the first solvent may again be directed from the solvent conduit to the ion source via the sampling space such that the second solvent is delivered to the ion source, and such that one or more reaction products contained within the second solvent and generated by said one or more reactants may be ionized for mass spectrometric analysis.

20 Claims, 5 Drawing Sheets

(56) References Cited

OTHER PUBLICATIONS

International Search Report and Written Opinion, PCT/IB2022/055907, dated Sep. 29, 2022, 19 pages.

* cited by examiner

METHODS AND SYSTEMS FOR PERFORMING REACTIONS WITHIN DIRECT SAMPLING INTERFACES FOR MASS SPECTROMETRIC ANALYSIS

RELATED APPLICATIONS

This application is a 35 U.S.C. § 371 national stage filing of International Application No. PCT/IB2022/055907, filed on Jun. 24, 2022, which claims priority to U.S. Provisional Application No. 63/217,202 filed on Jun. 30, 2021, the contents of both of which are incorporated herein in their entirety.

FIELD

The present teachings generally relate to mass spectrometry, and more particularly, to sampling interfaces for mass spectrometry systems and methods.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of a sample, some current MS techniques may require extensive pre-treatment steps to be performed on the sample prior to being able to ionize, analyze, and detect the analyte(s) of interest via MS. Such pre-analytical steps can include sampling (i.e., sample collection) and sample preparation (separation from a matrix, concentration, fractionation and, if necessary, derivatization). It has been estimated, for example, that more than 80% of the time of overall analytical process can be spent on sample collection and preparation in order to enable the analyte's detection via MS or to remove potential sources of interference contained within the sample matrix, while nonetheless increasing potential sources of dilution and/or error at each sample preparation stage.

In addition, certain experiments may require the synthesis of an excessive quantity of a compound in order to account for the constraints of conventional analytical systems such as low throughput and/or large sample requirements, and/or to monitor the kinetics of a reaction. By way of example, compounds that remain stable for only a brief duration following their synthesis must be generated substantially concurrently with their analysis such that detection can occur prior to the compounds' degradation.

There remains a need for providing high-throughput MS-based analytical devices.

SUMMARY

Methods and systems for delivering a liquid sample to an ion source for the generation of ions and subsequent analysis by mass spectrometry are provided herein. In accordance with various aspects of the present teachings, MS-based systems and methods are provided in which the flow of a first solvent within a sampling probe fluidly coupled to an ion source can be selectively stopped and the sampling space of the sampling probe drained such that one or more reactants (e.g., within a second solvent) can be added to the sampling space. In this manner, a bolus or "plug" of the reactants and/or their reaction products are delivered to the ion source upon re-initiating the flow of the first solvent through the sampling space of the sampling probe. In various aspects, the plug of reactants and/or their reaction products may be efficiently delivered to the ion source, thereby enabling decreased dilution, increased sensitivity, the use of a decreased volume of reagents, and/or improved monitoring of reaction kinetics.

In accordance with various exemplary aspects of the present teachings, a method for chemical analysis is provided, the method comprising directing a flow of a first solvent from a solvent conduit to an ion source via a sampling space of a sampling probe, wherein the sampling space is at least partially defined by an open end of the sampling probe. The flow of the first solvent into the sampling space from the solvent conduit may be terminated for a first duration, and the sampling space drained. A second solvent and one or more reactants may then be added to the drained sampling space through the open end during the first duration. Thereafter, the flow of the first solvent may again be directed from the solvent conduit to the ion source via the sampling space such that the second solvent is delivered to the ion source, and such that one or more reaction products contained within the second solvent and generated by said one or more reactants may be ionized for mass spectrometric analysis.

The first and second solvents may be the same or different. In some example aspects, the second solvent may be different from the first solvent and may be selected to facilitate the reaction between the one or more reactants, for example, even if not generally suitable or ideal for the particular ionization technique. In certain aspects, the second solvent may be diluted following the reaction, for example, as the second solvent is directed from the sample space to the ion source by the re-initiation of the flow of the first solvent from the solvent conduit to the ion source via the sampling space.

In various aspects, termination of the flow of the first solvent into the sampling space can be of a sufficient duration so as to generate the one or more reaction products within said sampling space. Additionally or alternatively, the one or more reaction products may be generated during delivery of the second solvent from the sampling space to the ion source. In certain example aspects, energy may be added to the second solvent disposed within the sampling space so as to increase a reaction rate. By way of example, thermal energy and/or ultrasonic energy may be added to the second solvent to facilitate the reaction.

In certain aspects, methods in accordance with the present teachings may be effective to efficiently deliver reaction products (e.g., synthesized compounds) to an ion source for MS-based analysis, thereby increasing throughput and the monitoring of reaction kinetics. Additionally or alternatively, methods in accordance with certain aspects of the present teachings may reduce the consumption of reagents. By way of example, in certain aspects, a volume of the second solvent and the one or more reactants may be less than about 100 nanoliters. In various example aspects, the one or more reactants may be added to the sampling space via a nano-scale dispenser such as an autosampler, a pipette, and a liquid droplet dispenser, all by way of non-limiting example.

In certain aspects, the method may further comprise inserting at least a portion of a substrate having one or more analytes adsorbed thereto within the second solvent disposed within the sampling space such that said one or more analytes are desorbed from said substrate into the second solvent, and reacting the one or more desorbed analytes with one or more reactants to generate the one or more reaction products. For example, the substrate may comprise a solid-phase microextraction (SPME) substrate or surface functionalized particles.

In certain aspects, the method may comprise continuously delivering fluid to the ion source during the first duration. By way of example, a flow of the first solvent from a reservoir may be directed to the ion source while bypassing the sampling space, for example, to maintain the stability of the one or more pumping mechanisms and/or the ion source.

In accordance with various exemplary aspects of the present teachings, a system for analyzing a chemical composition of a specimen is provided, the system comprising a reservoir for storing a first solvent and a sampling probe having a solvent conduit and a sampling conduit in fluid communication with one another via a sampling space, wherein the sampling space is at least partially defined by an open end of the sampling probe and configured to receive solvent from the reservoir via the solvent conduit. The system further comprises a fluid handling system comprising at least one pump for delivering the first solvent from the reservoir to the ion source via the sampling space and a controller operatively coupled to the fluid handling system. In various aspects, the controller may be configured to: direct a flow of the first solvent from the solvent conduit to the ion source via the sampling space; drain the first solvent from the sampling space by terminating the flow of said first solvent into the sampling space from the solvent conduit for a first duration, wherein the drained sampling space is configured to receive a second solvent and one or more reactants through said open end during said first duration; and following the first duration, direct a flow of the first solvent from the solvent conduit to the ion source via the sampling space such that the second solvent is delivered to the ion source, wherein the ion source is configured to ionize one or more reaction products contained within the second solvent for mass spectrometric analysis. The first and second solvents may be the same or different.

In certain aspects, the system may further comprise one or more nanoscale dispensers configured to add at least one of the second solvent and the one or more reactants to the sampling space via the open end. In some related aspects, the controller may be operatively coupled to the one or more nanoscale dispensers, and the controller may be configured to control the one or more nanoscale dispensers to add the second solvent and/or the one or more reactants to the drained sampling space through said open end during said first duration. For example, the nanoscale dispenser may comprise one of an autosampler, a pipette, and a liquid droplet dispenser.

In various aspects, the controller can select the first duration depending on the analysis to be performed. By way of example, in certain aspects, the first duration can be sufficient to generate the one or more reaction products within the sampling space. Additionally or alternatively, the one or more reaction products may be generated during delivery of the second solvent from the sampling space to the ion source.

The sampling probe can have a variety of configurations. By way of example, in certain aspects, the sampling space can define a volume such that the volume of the second solvent and the one or more reactants is less than about 100 nanoliters.

In various aspects, the system may further comprise an energy source for adding energy to the second solvent disposed within said sampling space so as to adjust the reaction rate (e.g., increase the rate of reaction). By way of non-limiting example, the energy source can comprise at least one of a thermal energy source and an ultrasonic energy source.

In various aspects, the fluid handling system may be configured to continuously deliver fluid to the ion source during the first duration. By way of example, the fluid handling system may be configured to direct a flow of the first solvent from the reservoir to the ion source while bypassing the sampling space, for example, to maintain the stability of the one or more pumping mechanisms and/or the ion source.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

Figure 1:
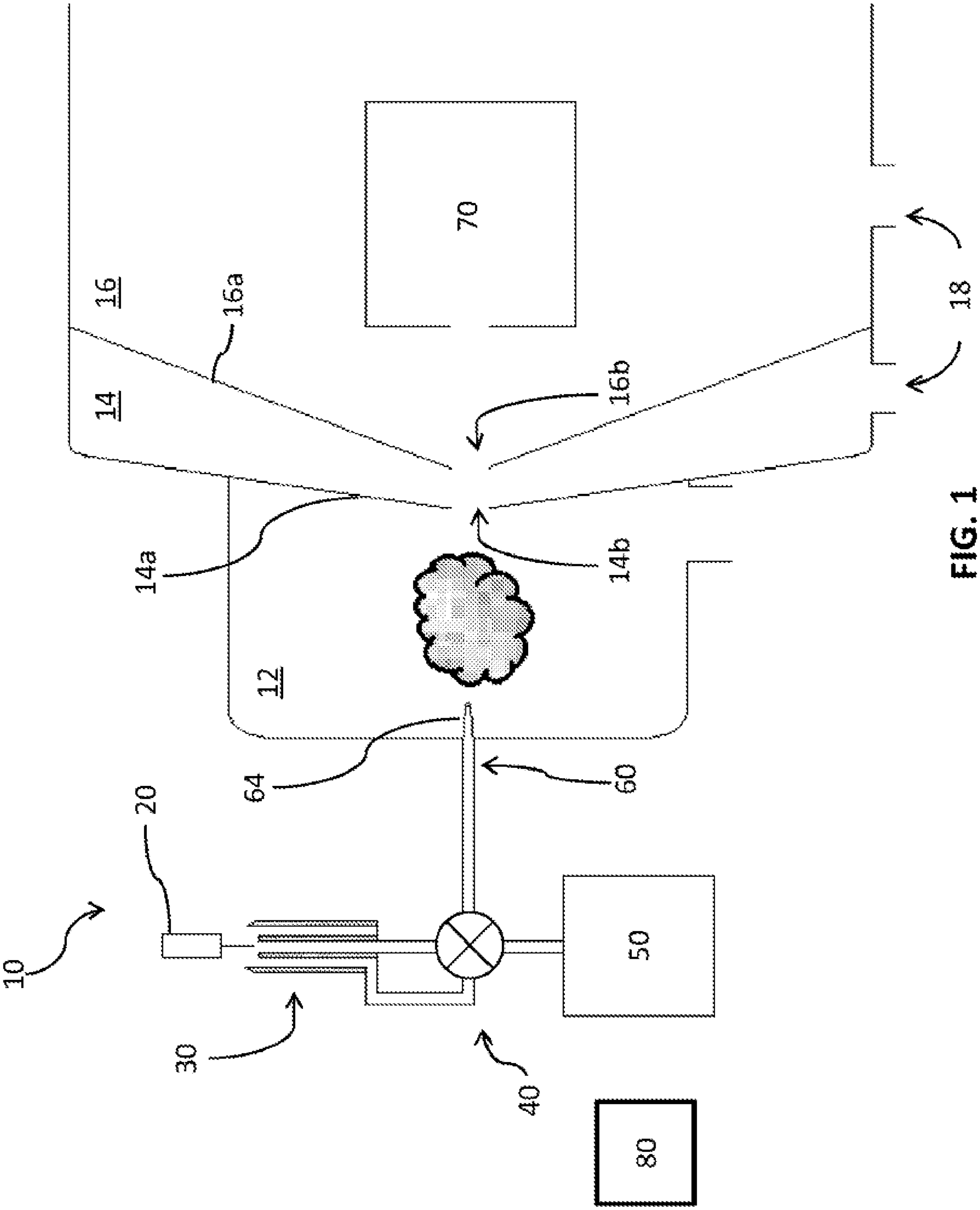
FIG. 1, in a schematic diagram, illustrates an exemplary system comprising a substrate sampling interface fluidly coupled to an electrospray ion source of a mass spectrometer system in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

In accordance with various aspects of the applicant's teachings, analytical systems and methods are provided herein which integrate the generation of reaction products and their MS-based detection via an open-port sampling probe. In various aspects, systems and methods in accordance with the present teachings may increase throughput while decreasing dilution, thereby enhancing sensitivity, improving monitoring of reaction kinetics, and/or decreasing the use of reagents. As discussed below, the flow of fluid through and volume of fluid within an open-port sampling probe can be selectively controlled so as to enable one or more reactants to be added to the drained sampling space of the sampling probe for reaction within the sampling probe, for example, directly prior to ionization upon re-initiating the flow of a solvent through the sampling space of the sampling probe. In accordance with various aspects of the present teachings, the solvent can be continuously delivered to the ion source during the stopped-flow condition of the sampling interface so as to maintain the stability of the one or more pumping and a sampling conduit, with a sampling space therebetween at an end of the sampling probe 30 that is open to the atmosphere and through which one or more reagents may be added to the fluid pathway. In accordance with various aspects of the present teachings, a controller 80 may be configured to control the fluid handling system 40 so as to terminate the flow of fluid from the reservoir 50 to the open end of the sampling probe 30 through the solvent conduit and to at least partially drain the sampling probe 30 such that a solvent and one or more reagents (e.g., a reagent within a solvent) may be added through the open end of the sampling probe 30 for reaction therein. With the one or more reagents added to the sampling space within the fluid pathway, the controller 80 may control the fluid handling system 40 to re-initiate the flow of a fluid (e.g., a solvent, the same or different from the solvent added with the one or more reagents) from the reservoir 50 to the ion source 60 via the sampling probe 30 such that the one or more reagents and/or their reaction products within the sampling space are directed toward the ion source 60 via the sampling conduit. In this manner, reaction products may be generated within the sampling probe 30 itself and may be fluidically transferred directly through the sampling conduit of the sampling probe 30 to the ion source 60 for discharge (e.g., via electrospray electrode 64) into an ionization chamber 12. A mass analyzer 70 in fluid communication with the ionization chamber 12 provides processing and/or detection of ions generated by the ion source 60.

As will be discussed in more detail below, the fluid handling system 40 may generally comprise one or more fluidic conduits, valves, and/or pumps for controlling the flow of liquid (e.g., solvent) between the reservoir 50, the sampling probe 30, and the ion source 60. In various aspects, the fluid handling system 40 can be operated (e.g., under the control of a controller 80) in a plurality of modes including a continuous flow mode in which solvent flows from the reservoir 50 to the ion source 60 via the sampling probe 30 and a stopped-flow mode in which the solvent from the reservoir 50 continues to be delivered to the ion source 60 while bypassing the sampling probe 30. In various aspects, present teachings further provide that the open port of the sampling probe 30 can be drained, for example, by controlling the relative flow rates of liquids within the solvent and sampling conduits. In various aspects, the duration of the stopped-flow mode can be selected to occur during the addition of one or more reagents to the drained sampling space of the sampling probe 30, all by way of non-limiting example.

The ion source 60 can have a variety of configurations but is generally configured to ionize analytes contained within a liquid (e.g., a solvent) that is received from the substrate sampling probe 30. In the exemplary embodiment depicted in FIG. 1, an electrospray electrode 64, which can comprise a capillary that is fluidly coupled to the substrate sampling probe 30, terminates in an outlet end that at least partially extends into the ionization chamber 12 and discharges the desorption solvent therein. As will be appreciated by a person skilled in the art in light of the present teachings, the outlet end of the electrospray electrode 64 can atomize, aerosolize, nebulize, or otherwise discharge (e.g., spray with a nozzle) the desorption solvent into the ionization chamber 12 to form a sample plume comprising a plurality of micro-droplets generally directed toward (e.g., in the vicinity of) the curtain plate aperture 14*b* and vacuum chamber sampling orifice 16*b*. As is known in the art, analytes contained within the micro-droplets can be ionized (i.e., charged) by the ion source 60, for example, as the sample plume is generated. By way of non-limiting example, the outlet end of the electrospray electrode 64 can be made of a conductive material and electrically coupled to a pole of a voltage source (not shown), while the other pole of the voltage source can be grounded. Micro-droplets contained within the sample plume can thus be charged by the voltage applied to the outlet end such that as the desorption solvent within the droplets evaporates during desolvation in the ionization chamber 12 such bare charged analyte ions are released and drawn toward and through the apertures 14*b*, 16*b* and focused (e.g., via one or more ion lens) into the mass analyzer 70. As discussed below, in some aspects of the present teaching, a fluid (e.g., solvent from reservoir 50) can be continuously delivered to the ion source 60 during the stopped-flow condition of the sampling interface so as to maintain the stability of the one or more pumping mechanisms and the ion source 60. Though the ion source probe is generally described herein as an electrospray electrode 64, it should be appreciated that any number of different ionization techniques known in the art for ionizing liquid samples and modified in accordance with the present teachings can be utilized as the ion source 60. By way of non-limiting example, the ion source 60 can be an electrospray ionization device, a nebulizer assisted electrospray device, a chemical ionization device, a nebulizer assisted atomization device, a photoionization device, a laser ionization device, a thermospray ionization device, or a sonic spray ionization device. It will be appreciated that in some aspects, the ion source 60 can optionally include a source of pressurized gas (e.g. nitrogen, air, or noble gas) that supplies a high velocity nebulizing gas flow which surrounds the outlet end of the electrospray electrode 64 and interacts with the fluid discharged therefrom to enhance the formation of the sample plume and the ion release within the plume for sampling by 14*b* and 16*b*, e.g., via the interaction of the high speed nebulizing flow and jet of liquid sample. The nebulizer gas can be supplied at a variety of flow rates, for example, in a range from about 0.1 L/min to about 20 L/min. In addition to or as an alternative to a pump for controlling the flow of liquid (e.g., solvent) from the sampling space to the ion source 60 (e.g., via the sampling conduit), the nebulizer gas can be effective to draw solvent through the sampling conduit (i.e., toward the ion source 60) due to suction generated by the interaction of the nebulizer gas and the solvent as it is being discharged by the electrospray electrode 64 (e.g., due to the Venturi effect).

In the depicted embodiment, the ionization chamber 12 can be maintained at an atmospheric pressure, though in some embodiments, the ionization chamber 12 can be evacuated to a pressure lower than atmospheric pressure.

The ionization chamber 12, within which analytes desorbed from the substrate 20 can be ionized as the desorption solvent is discharged from the electrospray electrode 64, is separated from a gas curtain chamber 14 by a plate 14*a* having a curtain plate aperture 14*b*. As shown, a vacuum chamber 16, which houses the mass analyzer 70, is separated from the curtain chamber 14 by a plate 16*a* having a vacuum chamber sampling orifice 16*b*. The curtain chamber 14 and vacuum chamber 16 can be maintained at a selected pressure (s) (e.g., the same or different sub-atmospheric pressures, a pressure lower than the ionization chamber) by evacuation through one or more vacuum pump ports 18.

It will also be appreciated by a person skilled in the art and in light of the teachings herein that the mass analyzer 70 can have a variety of configurations. Generally, the mass analyzer 70 is configured to process (e.g., filter, sort, dissociate, detect, etc.) sample ions generated by the ion source 60. By way of non-limiting example, the mass analyzer 70 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers. It will further be appreciated that any number of additional elements can be included in the system 10 including, for example, an ion mobility spectrometer (e.g., a differential mobility spectrometer) that is disposed between the ionization chamber 12 and the mass analyzer 70 and is configured to separate ions based on differences in their mobility through a drift gas in high- and low-fields rather than their mass-to-charge ratio). Additionally, it will be appreciated that the mass analyzer 70 can comprise a detector that can detect the ions which pass through the analyzer 70 and can, for example, supply a signal indicative of the number of ions per second that are detected.

Figure 2:
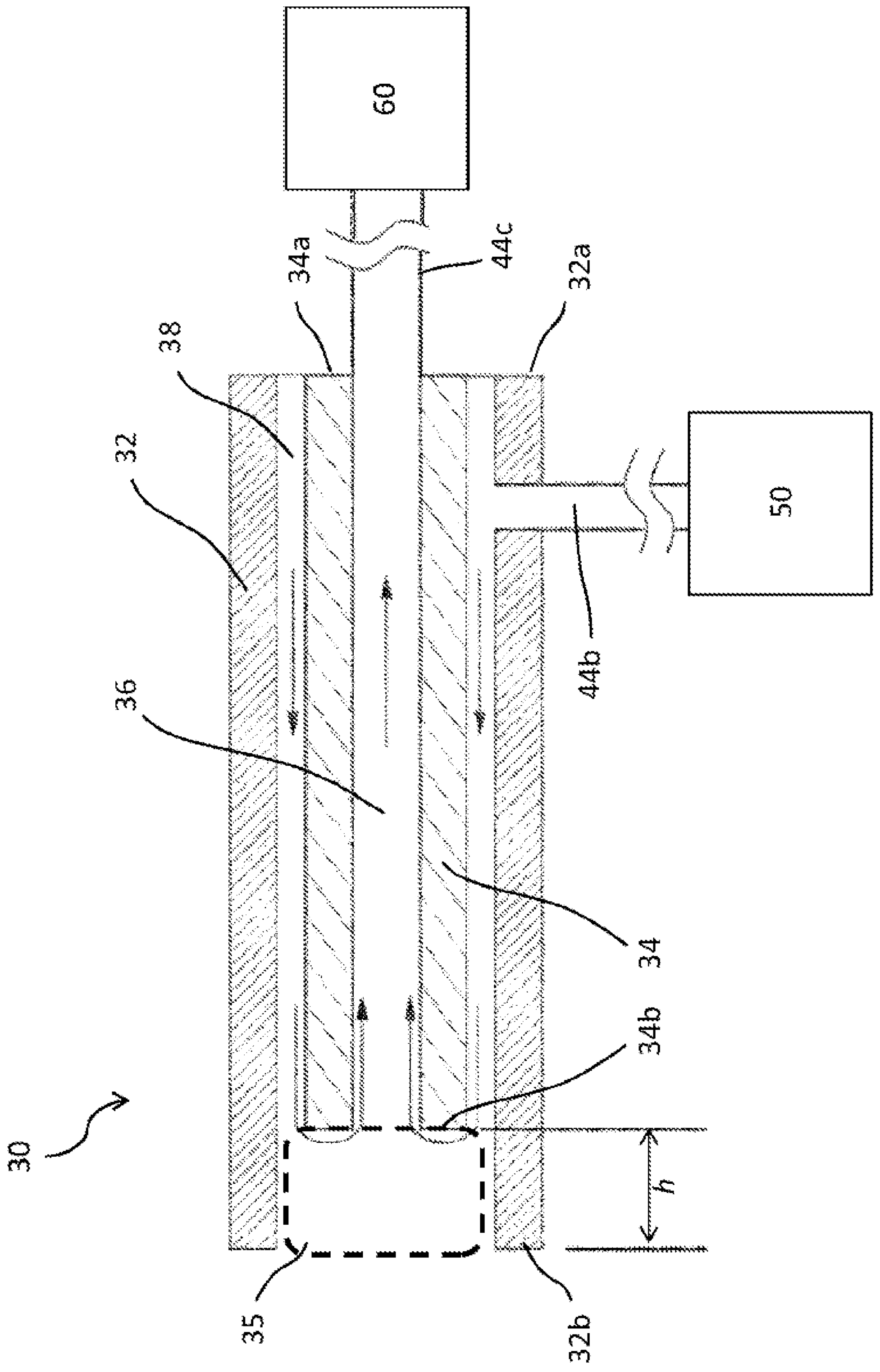
FIG. 2, in a schematic diagram, illustrates the exemplary substrate sampling interface of FIG. 1 in additional detail, in accordance with various aspects of the applicant's teachings.

With reference now to FIG. 2, an exemplary open port sampling probe 30 for receiving and reacting one or more reagents therewithin and suitable for use in the system of FIG. 1 is schematically depicted. Other non-limiting, exemplary sampling probes that can be modified in accordance various aspects of the systems, devices, and methods disclosed herein can be found, for example, in an article entitled "An open port sampling interface for liquid introduction atmospheric pressure ionization mass spectrometry," authored by van Berkel et al. and published in Rapid Communication in Mass Spectrometry 29(19), 1749-1756, which is incorporated by reference in its entirety. As shown, the sampling probe 30 is generally disposed between the reservoir 50 and ion source 60 and provides a fluid pathway therebetween such that reagents added through the open end of the sampling probe 30 can be entrained within solvent that is provided by the reservoir 50 and delivered to and ionized by the ion source 60. The sampling probe 30 can have a variety of configurations, but in the depicted exemplary configuration includes an outer tube (e.g., outer capillary tube 32) extending from a proximal end 32*a* to a distal end 32*b* and an inner tube (e.g., inner capillary tube 34) disposed co-axially within the outer capillary tube 32. As shown, the inner capillary tube 34 also extends from a proximal end 34*a* to a distal end 34*b*. The inner capillary tube 34 comprises an axial bore providing a fluid channel therethrough, which as shown in the exemplary embodiment of FIG. 2 defines a sampling conduit 36 through which liquid can be transmitted from the substrate sampling probe 30 to the ion source 60 of FIG. 1 via the probe outlet conduit 44*c* (i.e., the sampling conduit 36 can be fluidly coupled to the inner bore of the electrospray electrode 64 via the fluid handling system 40). On the other hand, the annular space between the inner surface of the outer capillary tube 32 and the outer surface of the inner capillary tube 34 can define a solvent conduit 38 extending from an inlet end coupled to the solvent source 50 (e.g., via the probe inlet conduit 44*b*) to an outlet end (adjacent the distal end 34*b* of the inner capillary tube 34). In some exemplary aspects of the present teachings, the distal end 34*b* of the inner capillary tube 34 can be recessed relative to the distal end 32*b* of the outer capillary tube 32 (e.g., by a distance h as shown in FIG. 2) so as to define a distal fluid chamber 35 of the substrate sampling probe 30 that extends between and is defined by the distal end 34*b* of the inner capillary 34 and the distal end 32*b* of the outer capillary tube 32. Thus, the distal fluid chamber 35 represents the space adapted to contain fluid between the open distal end of the substrate sampling probe 30 and the distal end 34*b* of the inner capillary tube 34. Further, as indicated by the arrows of FIG. 2 within the sampling probe 30, the solvent conduit 38 is in fluid communication with the sampling capillary 36 via this distal fluid chamber 35. In this manner and depending on the fluid flow rates of the respective channels, fluid that is delivered to the distal fluid chamber 35 through the desorption solvent conduit 38 can enter the inlet end of the sampling conduit 36 for transmission to its outlet end and subsequently to the ion source 60. It should be appreciated that though the inner capillary tube 34 is described above and shown in FIG. 2 as defining the sampling conduit 36 and the annular space between the inner capillary tube 34 and the outer capillary tube 32 defines the solvent conduit 38, the conduit defined by the inner capillary tube 34 can instead be coupled to the solvent source 50 (so as to define the solvent conduit) and the annular space between the inner and outer capillaries 34, 32 can be coupled to the ion source 60 (so as to define the sampling conduit).

As shown in FIG. 2, the solvent source 50 can be fluidly coupled to the solvent conduit 38 via a supply conduit 44*b* through which solvent can be delivered at a selected volumetric rate (e.g., via one or more pumping mechanisms including reciprocating pumps, positive displacement pumps such as rotary, gear, plunger, piston, peristaltic, diaphragm pump, and other pumps such as gravity, impulse and centrifugal pumps can be used to pump liquid sample), all by way of non-limiting example. The reservoir 50 may contain a variety of fluids though the solvent delivered to the fluid chamber through the solvent supply conduit 38 is generally amenable to the ionization process. Similarly, it will be appreciated that one or more pumping mechanisms can be provided for controlling the volumetric flow rate through the sampling conduit 36 and/or the electrospray electrode of the ion source 60, the volumetric flow rates selected to be the same or different from one another and the volumetric flow rate of the desorption solvent through the desorption solvent conduit 38. As discussed otherwise herein, in some aspects, these different volumetric flow rates through the various channels of the sampling probe 30 and/or the electrospray electrode 44 can be independently adjusted (e.g., by adjusting the flow rate of a nebulizer gas surrounding the discharge end of the electrospray electrode) so as to control the movement of fluid throughout the system 10 and/or the surface shape of the desorption solvent at the open end of the sampling probe 30. By way of non-limiting example, the volumetric flow rate through the solvent conduit 38 can be temporarily increased relative to the volumetric flow rate through the sampling conduit 36 such that the fluid in the distal fluid chamber 35 overflows from the open end of the substrate sampling probe 30 to clean any residual sample deposited by the withdrawn substrate and/or to prevent any airborne material from being transmitted into the sampling conduit 36 (e.g., after withdrawal of a substrate, before the insertion of another substrate). In various aspects, the flow of solvent into the distal fluid chamber 35 can be terminated and the chamber 35 drained (e.g., by removing solvent therein via the sampling conduit 36 and/or aspiration through the open end) such that additional fluid such as a second solvent and one or more reagents may be added to the drained distal fluid chamber while the flow of fluid into and out of the distal fluid chamber 35 via the supply conduit 38 or sampling conduit 36 is stopped.

It will be appreciated that sampling probes in accordance with the present teachings can have a variety of configuration and sizes, with the sampling probe 30 of FIG. 2 representing an exemplary depiction. By way of non-limiting example, the dimensions of an inner diameter of the inner capillary tube 34 can be in a range from about 1 micron to about 1 mm (e.g., 200 microns), with exemplary dimensions of the outer diameter of the inner capillary tube 34 being in a range from about 100 microns to about 3 or 4 centimeters (e.g., 360 microns). Also by way of example, the dimensions of the inner diameter of the outer capillary tube 32 can be in a range from about 100 microns to about 3 or 4 centimeters (e.g., 450 microns), with the typical dimensions of the outer diameter of the outer capillary tube 32 being in a range from about 150 microns to about 3 or 4 centimeters (e.g., 950 microns). The cross-sectional shapes of the inner capillary tube 34 and/or the outer capillary tube 32 can be circular, elliptical, superelliptical (i.e., shaped like a superellipse), or even polygonal (e.g., square). In one example embodiment, the inner tube 34 may exhibit a circular cross-sectional shape exhibiting an inner diameter of about 250 microns and an outer diameter of about 800 microns, while the outer tube 32 has a circular cross-sectional shape exhibiting an inner diameter of about 950 microns such that a fluid pathway is defined by the annular space between the inner wall of the outer tube 32 and the outer wall of the inner tube 34. Additional details regarding sampling probes suitable for use in the system of FIG. 1 and modified in accordance with the present teachings can be found, for example, in U.S. Pub. No. 20130294971 entitled "Surface Sampling Concentration and Reaction Probe" and U.S. Pub. No. 20140216177 entitled "Method and System for Formation and Withdrawal of a Sample From a Surface to be Analyzed" the teaching of which are hereby incorporated by reference in their entireties.

Figure 3B:
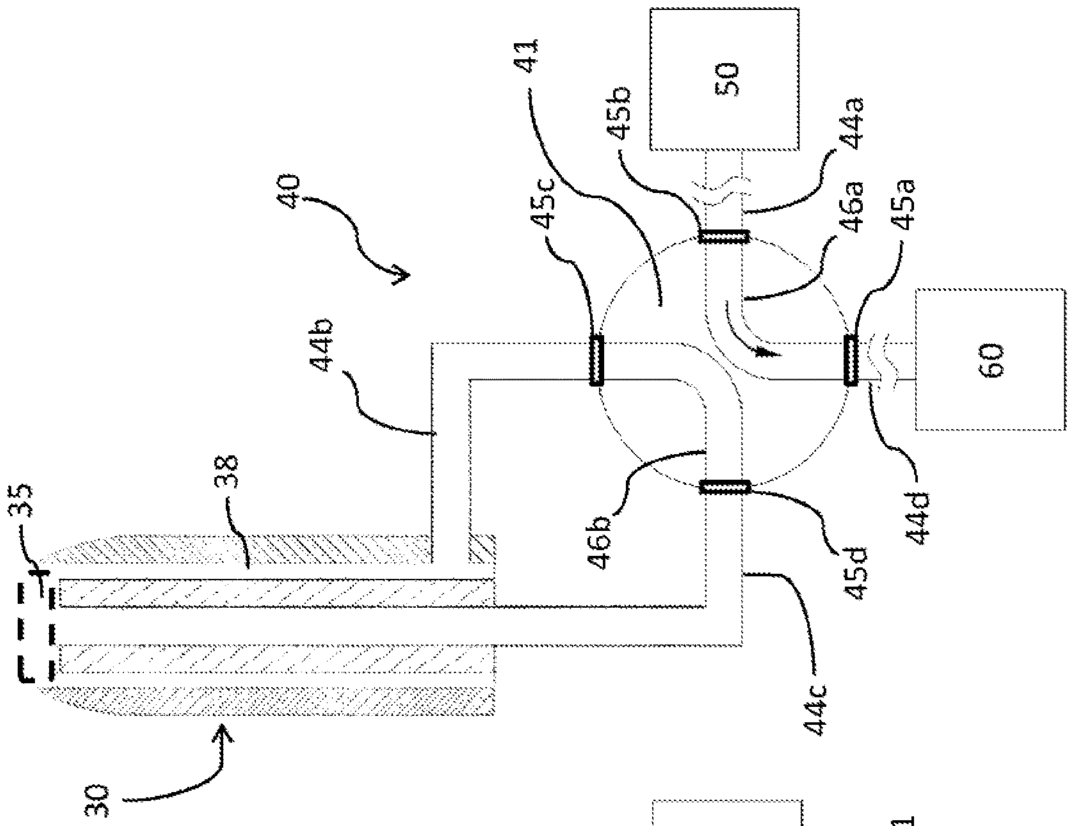
FIGS. 3A-B schematically depict an exemplary sampling probe for use in the system of FIG. 1, the sampling probe being operated in a first, continuous flow mode and a second, stopped flow mode, respectively, in accordance with various aspects of the present teachings.
Figure 3A:
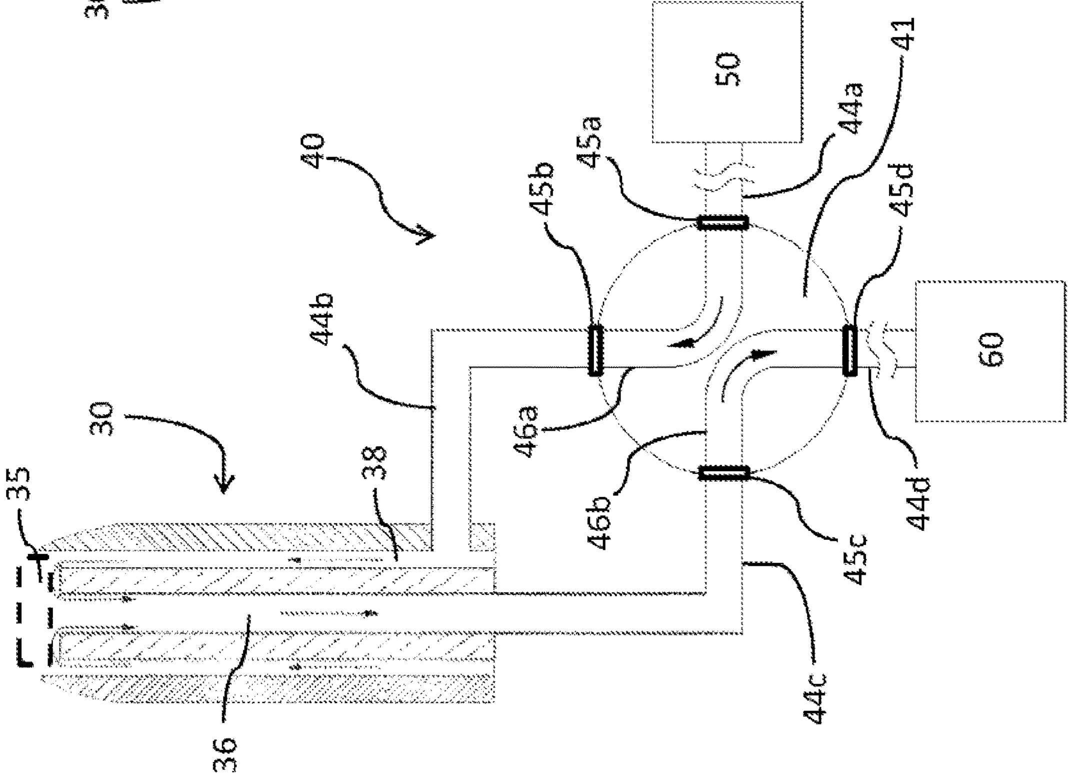

With reference now to FIGS. 3A and 3B, an exemplary fluid handling system 40 in accordance with various aspects of the present teachings is depicted in additional detail. As shown, the fluid handling system 40 comprises a valve 41 fluidly coupled to the reservoir 50, the sampling probe 30, and the ion source 60. It will be appreciated by a person skilled in the art that a pump (not shown) can additionally be provided so as to control the flow of fluid through the fluid handling system 40 as otherwise discussed herein. In the depicted fluid handling system 40, the valve 41 comprises a four-way valve having a plurality of passages **46*a,b* that can be selectively coupled to the various inlets and outlets of the components of the system 10 in accordance with various aspects of the present teachings. In particular, the valve 41 in a first configuration can provide a continuous fluid pathway from the reservoir 50 to the ion source 60 via the sample space 35 of the sampling probe 30 (FIG. 3A) and in a second configuration can provide a fluid pathway such that solvent flows directly from the reservoir 50 to the ion source 60 while bypassing the sampling probe 30 (e.g., without the solvent being delivered to the sample space 35) (FIG. 3B). It will be appreciated that actuating the valve 41 from the configuration of FIG. 3A to that of FIG. 3B, fluidly isolates the sampling probe 30 from the reservoir 50 and ion source 60 such that the flow of solvent within the sampling probe 30 would be substantially stopped. Nonetheless, the flow of fluid to the ion source 60 can continue while the valve is in stopped-flow configuration as shown in FIG. 3B, for example, at substantially the same volumetric flow rate as in the configuration of FIG. 3A, thereby maintaining the stability of the ion source 60** (e.g., the ion source does not need to be re-equilibrated following a dry condition).

As shown in the exemplary depiction of FIGS. 3A and 3B, the valve 41 can include a plurality of passages **46*a,b*, each of which is fluidly coupled to a fluid channel 44*a-d* via a port 45*a-d*. For example, in the continuous flow mode configuration of FIG. 3A, valve 41 provides a fluid passage 46*a* extending between the outlet channel 44*a* of the reservoir 50 and the inlet channel 44*b* of the sampling probe 30 so as to provide desorption solvent to the desorption solvent conduit 38. After being flowed through the sample space 35 and the sampling conduit 36, the solvent can then be transferred to the ion source 60 via the probe outlet channel 44*c*, the passage 46*b* within the valve 41, and the ion source inlet channel 44*d*. In accordance with various aspects of the present teachings, the fluid pathways in the fluid handling system 40 can be re-configured (e.g., under the control of a controller 80 of FIG. 1) to the stopped-flow mode configuration shown in FIG. 3B by actuating the valve 41, for example, for a first duration during which a solvent and/or one or more reactants may be added to the distal chamber 35 through the open end of the sampling probe 30. As depicted in FIG. 3B, for example, the passages 46*a,b* and ports 45*a-d* have been rotated 90° clockwise relative to the configuration shown in FIG. 3A such that the passage 46*a* directly connects the outlet channel 44*a* of the reservoir 50 and the ion source inlet channel 44*d* (thereby bypassing the sampling probe 30), while passage 46*b* connects the inlet and outlet channels 44*b,c* of the sampling probe 30, thus forming a closed circuit within the sampling probe 30 having substantially no fluid flow. In accordance with various aspects of the present teachings, the relative flow rates of solvent from reservoir 50 into and out of distal fluid chamber 35 can be controlled such that the distal fluid chamber is drained in order to receive solvent and/or one or more reagents through the open end of the sampling probe 30 for the generation of reaction products therewithin. By way of non-limiting example, the flow of solvent from reservoir 50 through the solvent conduit 38 can be terminated, while the flow through the sampling conduit 36 temporarily continues in order to empty the distal fluid chamber 35. It will be appreciated, that with the flow of solvent into and out of the distal fluid chamber 35** terminated, solvent can alternatively be removed therefrom, for example, by being aspirated (e.g., sucked out of the sampling probe's open end).

Figures 4A, 4B, 4C, 4D:
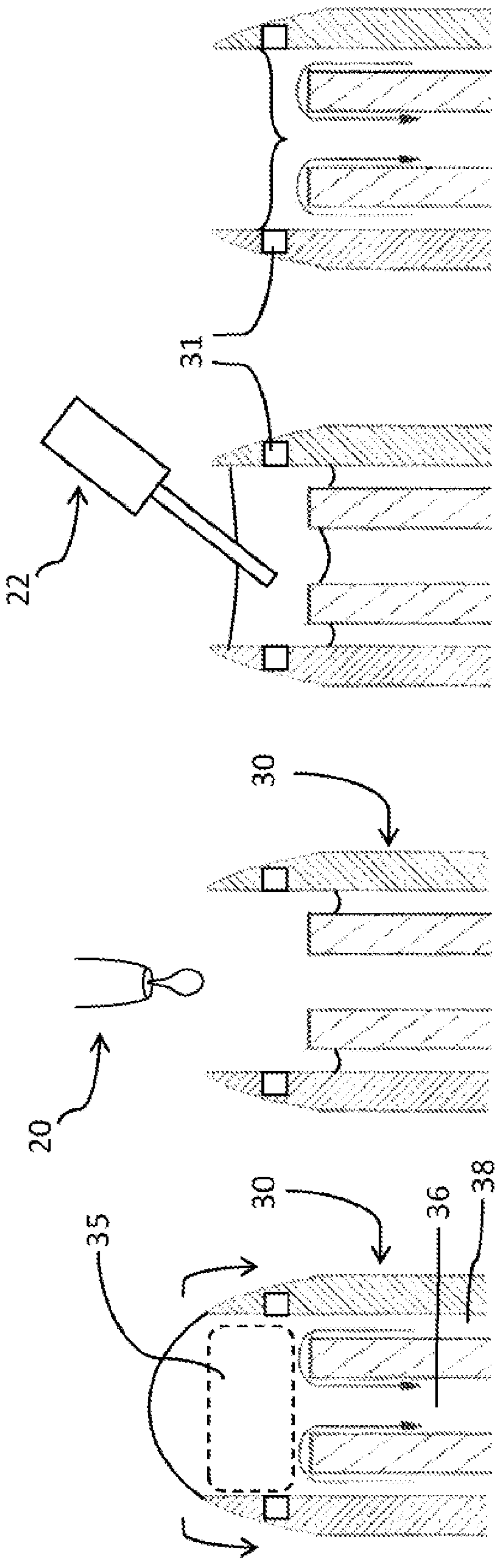
FIGS. 4A-4D schematically depict an exemplary sampling probe during the continuous flow mode and the second stopped flow mode, in accordance with various aspects of the present teachings.

With reference now to FIGS. 4A-D, these figures schematically represent various conditions of the fluid flow within the sampling probe 30 that can be generated in accordance with various aspects of the present teachings. During a continuous-flow mode as shown in FIG. 4A, for example, a first solvent is directed to the distal fluid chamber 35 at the open end of the sampling probe 30 from a reservoir (e.g., reservoir 50 of FIG. 1) via the supply conduit 38 prior to being directed through the sampling conduit 36 (e.g., to the ion source 60 of FIG. 1). As shown in FIG. 4A, in some aspects, the volumetric flow rate through the solvent conduit 38 can be temporarily increased relative to the volumetric flow rate through the sampling conduit 36 such that the fluid in the distal fluid chamber 35 overflows from the open end of the sampling probe 30, for example, to clean the open end of the sampling probe (e.g., to remove any previously-deposited reagents) and/or to prevent any airborne material from being transmitted into the sampling conduit 36.

With reference now to FIG. 4B, the controller 80 can cause the fluid handling assembly 40 to terminate the flow of the solvent through the solvent conduit 38 such that the distal fluid chamber 35 is drained, for example, through the sampling conduit 36. By way of example, after the flow of solvent into the distal fluid chamber 35 has been terminated, the flow of the nebulizer gas about the electrospray electrode may be effective to continue to draw solvent through the sampling conduit 36 (e.g., due to the Venturi effect) such that the solvent conduit is substantially emptied as depicted in FIG. 4B. As noted above, with the flow of solvent into and out of the distal fluid chamber 35 terminated, solvent can alternatively be drained, for example, by being aspirated through the open end. In various aspects, the sampling probe 30 may be fully drained or may retain a volume of the first solvent within the solvent conduit 38, for example, with the meniscus of the solvent below the level of the distal fluid chamber 35 as shown in FIG. 4B. Although the sampling probe 30 is depicted in FIGS. 4A-D with a vertical orientation with the open end at the top, it will be appreciated that the orientation of the sampling probe 30 need not be vertical. By way of example, if the sampling probe 30 were inverted relative to the depiction in FIG. 4, a meniscus like that depicted in FIG. 4B may nonetheless be formed at the liquid/air interface of the first solvent 35 and proximal to the distal end of the sampling conduit 36, regardless of orientation of the sampling probe 30, for example, depending on the sizes of the solvent and sampling conduits and the identity of the solvent.

With continued reference to FIG. 4B, one or more reagents may be added to the previously-drained fluid chamber 35 while the solvent flow is terminated through the open end of the sampling probe 30, for example, via a reagent dispenser 20. By way of example, each of a plurality of reagent dispensers may be utilized to simultaneously or consecutively add one or more reagents into the chamber 35 depending on the desired reaction. As shown in FIG. 4B, the reagent dispenser 20 may add a liquid such as a second solvent that facilitates the reaction. Though depicted as a dropper or pipette in FIG. 4B, the reagent dispenser 20 can have a variety of configurations and may deliver the reagent (s) to the distal chamber 35 in a variety of manners, whether presently known in the art or hereafter developed. By way of example, an acoustic droplet ejection device such as that described, for example, in U.S. Pat. No. 10,770,277, entitled "System and Method for the Acoustic Loading of an Analytical Instrument Using a Continuous Flow Sampling Probe," the teachings of which are hereby incorporated by reference in its entirety, may be used to eject one or more droplets from the surface of a fluid upwards toward and into the distal chamber 35 at the open end of the sampling probe 30. Moreover, as noted above, sampling probes in accordance with the present teachings can have a variety of configuration and sizes, and can be configured to contain a variety of volumes of the one or more reagents within the distal fluid chamber 35. In some example aspects, the volume of reagents added to the distal chamber 35 in stopped-flow mode may total a microliter or less (e.g., in the nanoscale range, about 100 nL) such that one or more nanoscale dispensers can provide the one or more reagents.

The second solvent may be the same as the first solvent provided by the reservoir, but in some aspects, the present teaching enable the use of a second solvent that is different from the first solvent. By way of example, while the first solvent may be generally amenable to the ionization process, it may not provide suitable or ideal conditions for performing the reactions of the one or more reagents. Exemplary solvents generally compatible with electrospray ionization and suitable for use as or within the first and/or second solvent in accordance with various aspects present teachings include water, acetonitrile, methanol, ethanol, propanol, nitromethane, dichloromethane (e.g., mixed with methanol), dichloroethane, tetrahydrofuran, and toluene, and mixtures thereof, all by way of non-limiting example. Exemplary buffers or modifiers generally compatible with electrospray ionization and suitable for use within the first and/or second solvent in accordance with various aspects present teachings include volatile salts or buffers (e.g., ammonium acetate, ammonium bicarbonate) and volatile acids (e.g., formic acid, acetic acid). On the other hand, exemplary solvents and modifiers generally incompatible or compatible in small amounts with electrospray ionization but suitable for use as the second solvent or within the second solvent added to the distal chamber 35 include dimethylformamide (DMF), dimethylsulphoxide (DMSO), trifluoroacetic acid (TFA), heptafluorobutyric acid, sodium dodecyl sulphate (SDS), ethylenediaminetetraacetic acid (EDTA), and involatile salts and buffers (e.g., sodium chloride, phosphates). Various aspects of the present teachings thus provide that a second solvent may be utilized to optimize the reaction conditions, for example, even if the second solvent is disfavored for the particular ionization technique. By way of non-limiting example, while DMSO in large amounts may compromise electrospray ionization, the present teachings may nonetheless enable DMSO as a reaction solvent (e.g., as a buffer) as the "plug" or bolus of the reactants is in small quantities and/or is sufficiently diluted as the added reagents are transmitted through the sampling probe 30 to the ion source.

It will also be appreciated in light of the present teachings, that methods and systems can additionally utilize solid reagents as well as liquid reagents as in FIG. 4B. For example, upon adding one or more liquid reagents to the drained chamber 35 as shown in FIG. 4B, a substrate 20 containing one or more reagents may contact the fluid within the chamber 35. By way of non-limiting example, the substrate may comprise a surface portion coated or functionalized to capture an analyte of interest. Upon contact with the liquid added to the chamber, the analyte of interest may thus be desorbed from the coated surface portion into the liquid, wherein it can react with one or more other reagents. Non-limiting examples of such substrates include a solid-phase microextraction (SPME) substrate or surface functionalized particles (e.g., HLB-PAN, C18-PAN, antibodies, etc.). As shown in FIG. 4C, an exemplary SPME substrate 22 having a coated surface to which analytes can be adsorbed, as described, for example, PCT Pub. No.

WO2015188282 entitled "A Probe for Extraction of Molecules of Interest from a Sample," the teachings of which are hereby incorporated by reference in its entirety, is schematically depicted as being inserted through the open end of the sampling probe 30 such that the coated surface is at least partially disposed in the solvent added to the distal chamber 35. It will be appreciated in light of the present teachings that a plurality of substrates can be inserted within the sampling space during a single duration of the stopped-flow mode such that analytes or reagents from multiple substrates can be added into the same volume of solvent within the sample space 35, depending, for example, on the desired experiment.

Following the addition of one or more solvents and reagents in the stopped-flow mode as in FIGS. 4B and 4C, the reactants and/or their reaction products may be directed from the distal fluid chamber 35 to the ion source, for example, by re-initiating the flow within the sampling probe 30. As shown in FIG. 4D, for example, the fluid handling system may control the relative volumetric flow rates within the supply conduit 38 and the sampling conduit 36 such that the added reactants and their liquid are flushed toward the ion source as a "plug" by the re-flowing first solvent. By way of example, the fluid handling system may cause a lower solvent flow rate through the solvent conduit 38 to be applied relative to the flow rate through the sampling conduit 36, thereby creating a vortex-like surface profile at the sampling probe's open end and which may reduce dilution of the "plug" of reagents, resulting in increased sensitivity and/or sharper peak shape of the MS-based analysis.

In accordance with various aspects of the present teachings, the flow of the first solvent need not be re-initiated immediately following the addition of the one or more reactants to the drained distal chamber 35 of the sampling probe. Indeed, a person skilled in the art will appreciate that the stopped-flow duration can be selected such that the desired reaction products are obtained by the time that the added reactants arrive at the ion source via the sampling conduit 36. Similarly, it will be appreciated that the duration of the stopped-flow mode can be selected such that reaction kinetics can be monitored, for example, by adjusting the incubation period within the fluid chamber for subsequent experiments utilizing the same reactants.

In addition to adjusting the timing of the stopped-flow duration to allow for the desired reaction to occur (e.g., incubation time within the fluid chamber 35 and/or as the one or more reagents are transported to the ion source), methods and systems in accordance with the present teachings can additionally or alternatively enable the adjustment of the reaction rate, for example, through the selective application of energy to the reactants in the fluid chamber 35. As shown in FIGS. 4A-D, for example, an energy source such as a thermal energy source and/or an acoustic energy source may be operatively coupled to the sampling probe so as to increase the reaction rate by heating the reactants and/or by increasing mixing within the fluid chamber 35.

Figure 5:
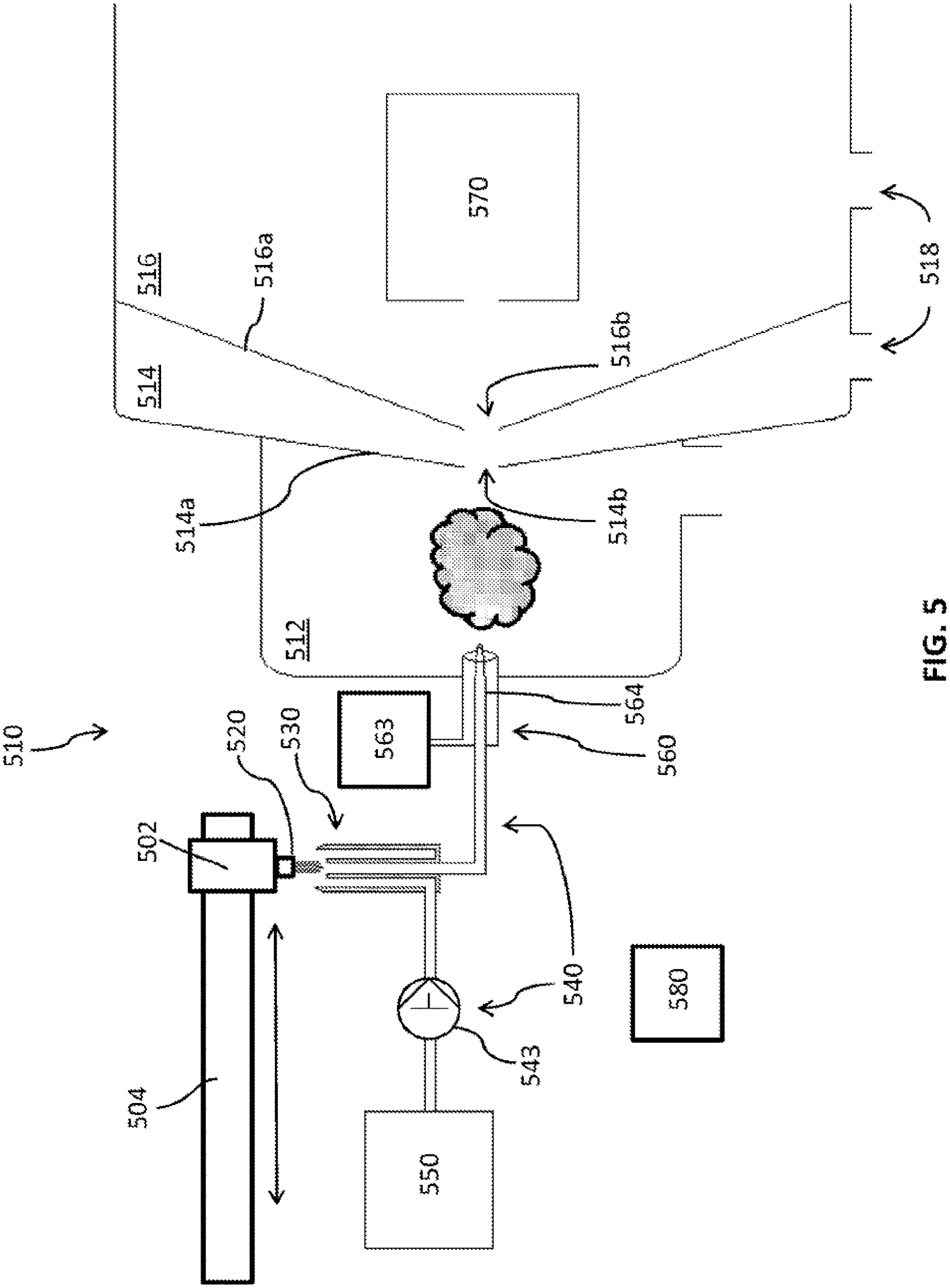
FIG. 5 depicts in schematic diagram an exemplary automated system for sample analysis in accordance with various aspects of the applicant's present teachings.

With reference now to FIG. 5, another exemplary sample analysis system 510 in accordance with various aspects of the present teachings is depicted. System 510 is similar to that discussed above with reference to FIGS. 1-4 in that it includes a reservoir 550 that can be fluidly coupled via a fluid handling system 540 to a sampling probe 530 and an ion source 560 so as to generate ions from analytes desorbed from a sample substrate 520 for analysis by the mass analyzer 570. As discussed otherwise herein, the fluid handling system 540 can be configured to terminate the flow of desorption solvent within the sampling probe 530 and drain the sampling space when adding reactants thereto.

As shown in FIG. 5, the exemplary system 510 can be automated (e.g., under the control of a controller 580) and can include an actuation mechanism 504 (e.g., robotic arm, stage, electromechanical translator, step motor, etc.) that is coupled to a sample holder 502 so as to grip, hold, or otherwise couple to the one or more reagent dispensers 520. One exemplary robotic system suitable for use in accordance with the present teachings is the Concept-96 autosampler marketed by PAS Technologies). Under the control of the controller 580 (e.g., without human intervention), for example, the actuation mechanism 504 can be configured to align the one or more reagent dispensers 520 with the open end of the sampling probe. By way of non-limiting example, some automated systems in accordance with the present teachings may utilize a plate having a plurality of wells for containing the various reagents. By aligning the various wells under the sampling probe's open end, a microdroplet acoustic dispenser, for example, could cause a droplet of the reagent within an aligned well to be added to the distal chamber of the sampling probe 530. Thereafter, the plate could be moved (e.g., under the control of controller 580) such that another reagent can be added.

As shown in FIG. 5, the exemplary fluid handling system 540 can comprise a pump 543 configured to pump solvent from the reservoir 550 to the sampling space of the probe 530. In various aspects, the pump 543 can be operatively coupled to the controller 580 such that the volumetric flow rate of the solvent from the reservoir to the sampling probe 530 (and within the sampling space) can be adjusted based on one or more signals provided by the controller 580. By way of example, the controller 580 can be configured to terminate the flow of solvent by the pump 543 and drain the distal chamber prior to addition of the one or more reagents thereto. Additionally or alternatively, the controller can be configured to increase the volumetric flow rate of solvent to the sampling space after a first reaction has been performed so as to temporarily overflow solvent through the open end to clean the sampling probe 530 prior to initiating another reaction.

As noted above, the system 510 is also shown to include a source 563 of pressurized gas (e.g. nitrogen, air, or noble gas) that supplies a high velocity nebulizing gas flow which surrounds the outlet end of the electrospray electrode 564 and interacts with the fluid discharged therefrom to enhance the formation of the sample plume and the ion release within the plume for sampling by 514*b* and 516*b*, e.g., via the interaction of the high speed nebulizing flow and jet of liquid sample. The nebulizer gas can be supplied at a variety of flow rates, for example, in a range from about 0.1 L/min to about 20 L/min, which can also be controlled under the influence of controller 580. In accordance with various aspects of the present teachings, it will be appreciated that the flow rate of the nebulizer gas can be adjusted (e.g., under the influence of controller 580) such that the flow rate of solvent from the sampling space (e.g., via sampling conduit 36 of FIG. 2) can be adjusted based, for example, on suction generated by the interaction of the nebulizer gas and the solvent as it is being discharged from the electrospray electrode 564 (e.g., due to the Venturi effect). In this manner, the controller 580 can additionally or alternatively control the flow rate of the solvent through the sampling probe in accordance with various aspects of the present teachings by adjusting one or more of a pump and/or valve for controlling the flow rate of the nebulizer gas. By way of non-limiting example, the controller 580 can be configured to terminate the flow of desorption solvent provided by the pump 543 while maintaining the flow of nebulizer gas provided from the nebulizer source 563 (e.g., via one or more valves) so as to drain the solvent from the sampling probe 530 during the stopped-flow mode.

Although some aspects above have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit.

Depending on certain implementation requirements, embodiments of the invention can be implemented in hardware and/or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed (e.g., under the control of a controller having one or more processors). Therefore, the digital storage medium may be computer readable.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier. In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. A method for chemical analysis, comprising:

directing a flow of a first solvent from a solvent conduit to an ion source via a sampling space of a sampling probe, wherein said sampling space is at least partially defined by an open end of the sampling probe;

draining said first solvent from said sampling space by terminating the flow of said first solvent into the sampling space from the solvent conduit for a first duration;

adding a second solvent and one or more reactants to said drained sampling space through said open end during said first duration;

following the first duration, directing the flow of the first solvent from the solvent conduit to the ion source via the sampling space such that the second solvent is delivered to the ion source; and ionizing one or more reaction products contained within the second solvent and generated by said one or more reactants for mass spectrometric analysis.

2. The method of claim 1, wherein said first and second solvents are different.

3. The method of claim 1, wherein said first duration is sufficient to generate said one or more reaction products within said sampling space.

4. The method of claim 1, wherein said one or more reaction products are generated during delivery of the second solvent from the sampling space to the ion source.

5. The method of claim 1, wherein a volume of the second solvent and the one or more reactants is less than about 100 nanoliters.

6. The method of claim 1, wherein said one or more reactants are added to the sampling space via a nano-scale dispenser, and wherein, optionally, said nanoscale dispenser comprises one of an autosampler, a pipette, and a liquid droplet dispenser.

7. The method of claim 1, further comprising:

inserting at least a portion of a substrate having one or more analytes adsorbed thereto within the second solvent disposed within the sampling space such that said one or more analytes are desorbed from said substrate into the second solvent; and reacting said one or more analytes with said one or more reactants to generate the one or more reaction products.

8. The method of claim 7, wherein the substrate comprises one of a solid-phase microextraction substrate and surface functionalized particles.

9. The method of claim 1, further comprising adding energy to the second solvent disposed within said sampling space to increase a reaction rate, wherein, optionally, said energy comprises one of thermal energy and ultrasonic energy.

10. The method of claim 1, further comprising continuously delivering fluid to the ion source during said first duration, wherein, optionally, said continuously delivering fluid to the ion source during said first duration comprises directing a flow of the first solvent from a reservoir to the ion source while bypassing the sample space.

11. A system for analyzing a chemical composition of a specimen, comprising:

a reservoir for storing a first solvent;

a sampling probe having a solvent conduit and a sampling conduit in fluid communication with one another via a sampling space, said sampling space being at least partially defined by an open end of the sampling probe and configured to receive solvent from the reservoir via the solvent conduit;

a fluid handling system comprising at least one pump for delivering the first solvent from the reservoir to the ion source via the sampling space; and a controller operatively coupled to the fluid handling system, wherein the controller is configured to:

direct a flow of the first solvent from the solvent conduit to the ion source via the sampling space;

drain said first solvent from said sampling space by terminating the flow of said first solvent into the sampling space from the solvent conduit for a first duration, wherein the drained sampling space is configured to receive a second solvent and one or more reactants through said open end during said first duration; and following the first duration, direct a flow of the first solvent from the solvent conduit to the ion source via the sampling space such that the second solvent is delivered to the ion source, wherein the ion source is configured to ionize one or more reaction products contained within the second solvent for mass spectrometric analysis.

12. The system of claim 11, wherein said first and second solvents are different.

13. The system of claim 11, further comprising one or more nanoscale dispensers configured to add at least one of the second solvent and the one or more reactants to the sampling space via the open end.

14. The system of claim 13, wherein the controller is operatively coupled to the one or more nanoscale dispensers, wherein the controller is further configured to add, via the one or more nanoscale dispensers, the at least one of the second solvent and the one or more reactants to said drained sampling space through said open end during said first duration.

15. The system of claim 11, wherein said first duration is sufficient to generate said one or more reaction products within said sampling space.

16. The system of claim 11, wherein said one or more reaction products are generated during delivery of the second solvent from the sampling space to the ion source.

17. The system of claim 11, wherein a volume of the second solvent and the one or more reactants is less than about 100 nanoliters.

18. The system of claim 11, further comprising an energy source for adding energy to the second solvent disposed within said sampling space to increase a reaction rate, wherein, optionally, said energy source comprises one of a thermal energy source and an ultrasonic energy source.

19. The system of claim 11, wherein the fluid handling system is configured to continuously deliver fluid to the ion source during said first duration.

20. The system of claim 11, wherein the fluid handling system is configured to direct the first solvent from the reservoir to the ion source while bypassing the sample space during said first duration.

* * * * *